United States Patent [19]

Mihalik

[11] 3,822,108

[45] July 2, 1974

[54] HEATING SYSTEM FOR EXTRUSION OF THERMOPLASTICS

[75] Inventor: John A. Mihalik, Swarthmore, Pa.

[73] Assignee: FMC Corporation, Philadelphia, Pa.

[22] Filed: Mar. 20, 1972

[21] Appl. No.: 236,106

[52] U.S. Cl. .............................. 425/143, 425/378
[51] Int. Cl. ................................................ B29f 3/08
[58] Field of Search .......... 425/142, 151, 378, 381, 425/143

[56] References Cited
UNITED STATES PATENTS

| | | | |
|---|---|---|---|
| 3,354,501 | 11/1967 | Bachman et al. | 425/378 |
| 3,474,495 | 10/1969 | Deutsch et al. | 425/381 X |
| 3,497,189 | 2/1970 | Donahue | 164/337 X |
| 3,517,097 | 6/1970 | Mixell et al. | 425/378 X |
| 3,557,717 | 1/1971 | Chivers | 425/378 |
| 3,674,407 | 7/1972 | Neuhaus | 425/378 |
| 3,728,056 | 4/1973 | Theysohn | 425/142 |

*Primary Examiner*—R. Spencer Annear

[57] ABSTRACT

Extrusion apparatus in which a flow line for transporting molten thermoplastic polymeric material from a supply source to a shaping die, and including portions of the die itself, are enveloped by a circulating heated gas to minimize the introduction of temperature differentials into such molten material during its transit and thereby provide for extruded products having improved properties.

4 Claims, 3 Drawing Figures

PATENTED JUL 2 1974

3,822,108

HEATING SYSTEM FOR EXTRUSION OF THERMOPLASTICS

The present invention is directed to the manufacture of extruded products of thermoplastic polymeric materials having improved properties, and particularly, to an improved apparatus in which a mass of molten thermoplastic polymeric material is maintained at a desired uniform elevated temperature during the transit and extrusion thereof.

The apparatus of the present invention is adapted for use with a variety of temperature-sensitive materials; that is, materials which must be maintained within a desired elevated temperature range to facilitate their transfer and intended use and which, at such elevated temperature may suffer damage to or destruction of chemical and/or physical properties thereof. Specifically, the apparatus of the present invention is eminently suited for use in the transfer of thermoplastic polymeric film or fiber-forming materials, such as polyamides, polyesters, polyethylenes, etc., from an extruder, in which they are rendered molten, to and through a nozzle or die from which they are extruded as shaped products.

Molten thermoplastic polymeric material which is exposed to excessively high temperatures generally experiences degradation and gelling which alters its viscosity and, frequently, produces deposits within such material and/or on the heated equipment surfaces with which such material contacts. Similarly, the application of insufficient or varying degrees of heat to a molten thermoplastic polymeric material during its transfer generally results in variations in its viscosity and often in gel formations.

Variations in the viscosity of the material being extruded and/or the presence of deposits within such material and/or on equipment surfaces is evident by non-uniform characteristics, i.e., drawability and dyeability, in the resulting extruded products, as well as the inclusion of deposits within such products. Thus, aside from making an inferior product, interruptions during extrusion and/or subsequent product treating operations, such as film or fiber stretching, is often experienced.

The existence of gels and/or the other deposits within the molten thermoplastic polymeric material necessitates frequent changes in filters, while a build-up of deposits on heated equipment surfaces may involve a complete cessation of extrusion operations for proper removal of such deposits.

Electric band heaters have proven to be inadequate for the task involved and may well contribute to the introduction of temperature differentials, and thus viscosity variations, in the molten material during its transit. Similarly, temperature control of molten thermoplastic polymeric materials by means of a heat-transfer oil or other liquid or vapor is only partially successful. Due to insurmountable liquid or vapors leakage difficulties, along with cold-spot problems such system affords little or no temperature control over molten thermoplastic polymeric material during its passage through the extrusion die itself, or requires expensive design to avoid leakage of offensive vapors. Thus, polymeric films produced with the apparatus employing these conventional temperature control systems are characterized by poor gauge properties and are difficult, if not impossible, to stretch in an attempt to secure orientation of the molecules thereof.

Accordingly, a primary object of this invention is to provide a generally new or improved and more satisfactory apparatus for transporting heated flowable materials.

Another object is the provision of an improved thermally insulated apparatus for transporting flowable materials and maintaining such materials within a desired temperature range during the transport and extrusion thereof.

Still another object is the provision of an apparatus in which a flow-line, including an extrusion die, through which molten thermoplastic polymeric material is conveyed, is enveloped by a circulating heated gas to at least minimize temperature differentials within such material during its transport and extrusion.

A further object is the provision of a thermally insulated flow-line for molten thermoplastic polymeric material in which heat losses are minimized, and which, when desired operating conditions have been obtained, necessitates a minimum of heat input.

A still further object is the provision of an improved extrusion apparatus having a transfer line for heated flowable materials in which heat losses are minimized, which is simple to fabricate, and can be readily disassembled for repair and maintenance.

These and other objects are accomplished in accordance with the present invention by an apparatus in which molten thermoplastic polymeric material is continuously delivered under pressure from a supply means, such as an extruder, to an extrusion die or nozzle through conduit means, which conduit means together with portions of the die itself, are enveloped by a circulating heated gas. A continuous shield formed of thermal insulating material surrounds and is spaced from the conduit means and portions of the extrusion die and defines with such conduit means and die portions an unobstructed passage through which the heated gas is circulated. More particularly, this heat shield is connected at one end thereof to the supply means and at its opposite end engages snugly with the die at a location adjacent to but spaced from its extrusion orifice.

The conduit means may be of conventional construction, generally including a plurality of flanged pipes connected in end-to-end relationship. With such construction, the internal surface of the heat shield is formed with a smooth contour which conforms at least generally with the interconnected flanged pipes so as to avoid areas in which the heated gas may remain stagnant and also to minimize turbulence in the gas flow. The circulating means for the heated gas includes openings in the heat shield at locations adjacent to the supply means and the die, a blower, a heater, and ducts connecting the blower, heater and heat shield openings to provide, with such heat shield a generally closed system for the heated gas.

In the manufacture of films, the die employed in the apparatus of the present invention would, of course, include a pair of elongated blades which together define an orifice for shaping the molten thermoplastic polymeric material into a flat, thin, continuous film as it is extruded therethrough. In this instance, the heat shield is preferably formed with openings along opposite sides of the film extrusion die so as to assure a desired flow of the heated gas along all die areas.

At least one heat sensor projects into the gas flow passage, preferably at a location adjacent to a discharge opening therein, and serves to measure the temperature of the heated gas as it is exhausted from such passage. Desirably, a controller is operatively connected with the heat sensor and the heater for regulating the amount of heat transferred to the circulating gas during its travel through the heater.

The circulating heated gas employed in the apparatus of the present invention is inert and, from the standpoint of economy, is preferably air.

In view of the stresses imposed upon the die under the thermal conditions encountered, the die is engaged snugly by the heat shield without any rigid connection between these members. It is expected, therefore, that at times some of the circulating heated gas may escape from the flow passage in the area of the extrusion die. While such occurrence has no detrimental effect on the product which is being extruded, for optimum performance of the apparatus of the present invention the gas within the system is at least periodically replenished. This is most easily achieved by employing a conventional centrifugal blower having an inlet through which air, from the ambient atmosphere, or other gas may be introduced. Preferably, the admission of air or other gas into the system is regulated by a controller which, in turn, in response to variations in the pressure of the circulating heated gas, is measured by a suitable sensor.

The heat shield may be formed of any suitable thermal insulating material, as for example fiberglass, and is preferably shaped into preformed panels which are connected to each other about the conduit means, as by quick-release fasteners for easy assembly and removal.

During the start of extrusion operations with the above described apparatus, the heated gas circulated through the generally closed system will eventually bring all the encased areas of the conduit means and extrusion die to the desired elevated temperatures. With the heated gas being continuously circulated and maintained at a substantially constant temperature, there is thereafter no significant heat transfer to or from the members of the apparatus encased by the heat shield. In the event gas is lost from this system its escape is detected by a pressure sensor within the flow passage and is replenished and brought to the desired elevated temperature, preferably before being circulated within the flow passage itself.

The apparatus of the present invention is hereafter described in detail as employed in the manufacture of films from molten thermoplastic polymeric materials.

For a greater understanding of this invention, reference is made to the following description and drawing in which.

Figure 1:
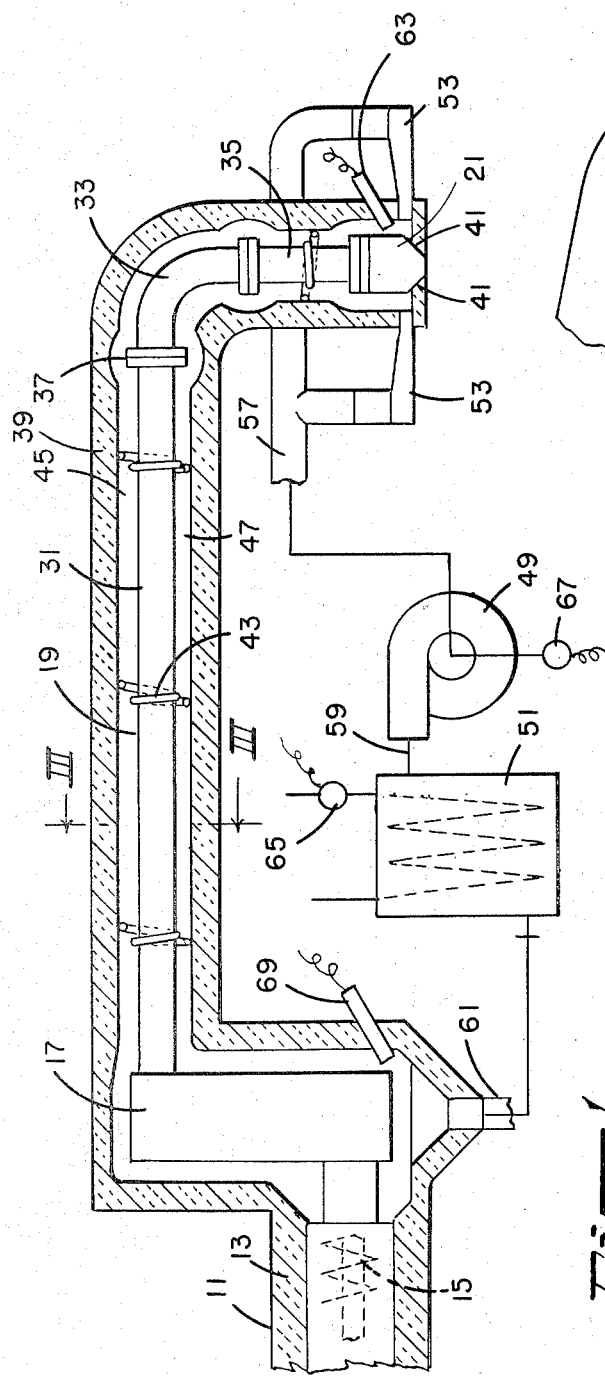
FIG. 1 is a side view of the apparatus of the present invention, with a portion thereof being broken away to illustrate interior details thereof.

With reference to FIG. 1 of the drawing, character 11 indicates a portion of a conventional extruder which includes a barrel 13 and a screw 15. Heating means, not shown, serve to melt pellets of thermoplastic polymeric material such as polyethylene terephthalate, within the barrel 13 concomitantly with the advancement therethrough by the screw 15. The molten thermoplastic polymeric material which is discharged from the extruder 11 passes into and through one of a pair of parallel filter units 17 through a diverter valve, not shown, and into a conduit means 19 which delivers the same to a die or nozzle 21.

Positioned between the extruder 11 and filter units 17, but not illustrated, is a second diverter valve which cooperates with the first mentioned valve for directing flow through one of the parallel filter units while the other such pair of filter units is undergoing cleaning or other service. The extruder, filter units, diverter valves and die are of conventional construction and serve merely to illustrate the application of the apparatus of the present invention.

Figure 2:
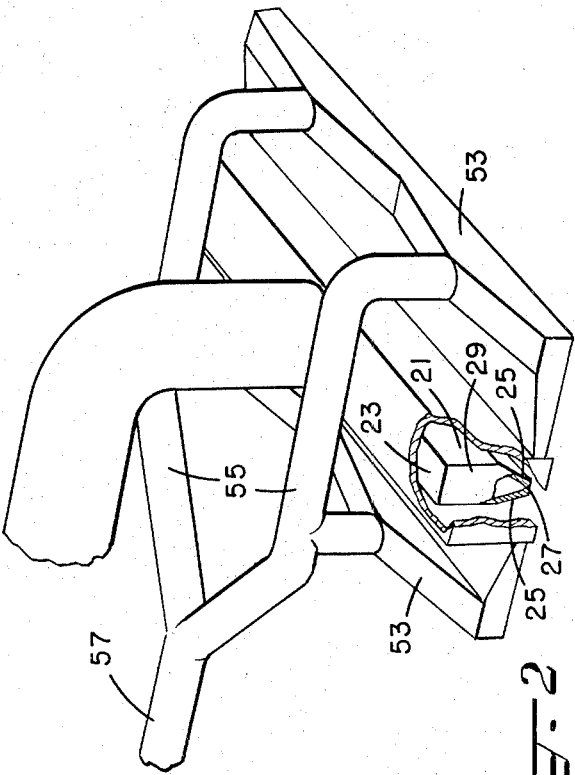
FIG. 2 is a perspective view of a portion of the apparatus shown in FIG. 1.
Figure 3:
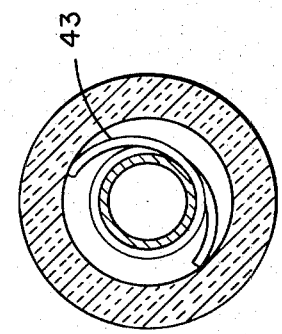
FIG. 3 is a transverse section taken along the lines III—III of FIG. 1.

The die 21, together with the filter units 17 and conduit means 19 constitute and are referred to as the "flow line" for the molten thermoplastic polymeric material from the extruder 11. A fragmentary portion of the die 21 is illustrated in FIG. 2 and includes a housing 23, blades 25 which are adjustable by suitable means, not shown, to provide an orifice 27 of desired size and end plates 29.

In the embodiment illustrated in the drawing, the conduit means 19 simply consists of a straight horizontal pipe section 31 extending from the diverter valve at the exit of the filter units 17 to an elbow pipe section 33, and a straight vertical pipe section 35 which connects the elbow section 33 to nozzle 21. All of such pipe sections are provided with flanges 37 at the ends thereof to facilitate the attachment thereof to each other and to the nozzle 21.

Surrounding the conduit means 19 and the major portion of the die 21 is a heat shield 39 which is formed of thermal insulating material, such as fiberglass. One end of the heat shield 39 is fixed to the extruder 11 and at its opposite end, indicated at 41, engages snugly with the nozzle 21 without being rigidly attached thereto. Spacers 43 serve to maintain the heat shield 39 separated from the conduit means 19 and are preferably of such construction as to offer minimal resistance to flow of a gas relative thereto. The internal surface 45 of the heat shield 39 cooperates with the opposing surfaces of the conduit means 19 and die 21 to provide a continuous passage 47. Such surface 45 is smooth and of a contour which conforms with the configuration of the conduit means 19 and die 21, so as to minimize turbulence and areas of low or stagnant flow in a gas as it travels through the passage 47.

The passage 47, together with a blower 49, heater 51 and suitable conduits, provide a generally closed system through which a heated inert gas, and preferably hot air, is continuously circulated. As shown in FIG. 2, the heat shield 39, is spaced from the walls of the die housing 23 and end plate 29. At this area, exhaust chambers 53 extend through the heat shield 39 and open into the passage 47. The chambers 53 are disposed along opposite sides of and are slightly longer than the die 21 to assure the complete removal of gas from this area. By means of ducts 55, the chambers 53 are connected to a conduit 57 which conveys the spent gas to the blower 49.

From the blower 49 the gas is delivered by a conduit 59 to the heater 51 and is then returned to the passage 47 by a conduit 61 which extends through the heat shield 39 at a location adjacent to the filter units 17.

A sensor 63 extends into the passage 47 at a location adjacent to one of the exhaust chambers 53 and is electrically connected to a controller 65 which regulates the operation of the heater 51.

Notwithstanding the snug engagement of the heat shield 39 with the die 21, escape of heated gas from the passage 47 may at times be experienced at the end of the heat shield indicated at 41. Any such loss of gas is, of course, replenished and, in the case of air, is drawn into the system through the blower 49 and then passed through the heater 51 before entering into the passage 47. The admission of air into the system from the ambient air through the blower is regulated by a controller 67 which is electrically connected to a pressure sensor 69 located within the passage 47.

In the operation of the above described apparatus, air is initially drawn into the closed system through the blower 49, and is elevated to a desired temperature concomitantly with its continuous circulation through the system. Once the conduit means 19 and die 21 are at the same temperatures as the circulating gas, no heat is transferred to or from such conduit means and die. Thus, the molten thermoplastic polymeric material being conveyed through the conduit means 19 and die 21 experience no variation in temperature during its transit and ultimate extrusion.

Heat losses through the thermal insulation forming the heat shield 39 will be detected by the sensor 63 which, in turn, will activate the heater 51 through the controller 65. Similarly, a drop in pressure in the heated circulating air, as determined by the sensor 69, sets the controller 67 in operation which in turn causes the blower 49 to draw air from the ambient atmosphere into the system.

In lieu of the arrangement described, the heated circulating air may be introduced into the passage 47 in the area of the die 21 and exhausted through the conduit 61. In this instance the locations of the blower 49 and heater 51 are reversed from that shown in FIG. 1 to insure that air introduced into the system from the ambient atmosphere is heated prior to its flow into the passage 47.

It is to be understood that changes and variations may be made without departing from the spirit and scope of the invention as defined in the appended claims.

I claim:

1. Apparatus for making a film of thermoplastic polymeric material having improved properties including supply means for continuously delivering molten thermoplastic polymeric material under pressure, conduit means connected at one end to said supply means for receiving molten thermoplastic polymeric material therefrom, a die connected to the opposite end of said conduit means, said die having blades which together define an elongated orifice from which the molten thermoplastic polymeric material is extruded as a flat, thin, continuous film, a continuous heat shield formed of thermal insulating material connected at one end to said supply means and at its opposite end in snug contact with said die at a location adjacent to its extrusion orifice, said heat shield surrounding and being spaced from the remainder of said die and said conduit means to provide a passage therebetween, and means for continuously circulating a heated gas through said passage, said circulating means including openings in said heat shield at locations adjacent to said supply means and along opposite sides of said die, a blower, a heater, and ducts extending between said blower, heater, and heat shield openings to provide, with said heat shield, a generally closed system for the heated gas.

2. Apparatus as defined in claim 1 further including a heat sensor extending into said passage at a location adjacent to a discharge opening in said heat shield for measuring the temperature of the gas as it is exhausted therefrom, and a controller operatively connected to said sensor and said heater for regulating the amount of heat transferred to the circulating gas.

3. Apparatus as defined in claim 1 wherein said heated gas is air and said blower includes means for admitting air into the closed system from the ambient atmosphere, and further including means extending into such passages for measuring the pressure of the heated air circulating therethrough and a controller operatively connected to such pressure measuring means and said blower selectively admitting air into said closed system.

4. Apparatus as defined in claim 3 further including a heat sensor extending into said passage at a location adjacent to the discharge openings in said heat shield for measuring the temperature of the air as it is exhausted therefrom, and a controller operatively connected to said sensor and said heater for regulating the amount of heat transferred to the air in such closed system.

* * * * *

UNITED STATES PATENT OFFICE
CERTIFICATE OF CORRECTION

Patent No. 3,822,108          Dated July 2, 1974

Inventor(s) John A. Mihalik

It is certified that error appears in the above-identified patent and that said Letters Patent are hereby corrected as shown below:

Col. 1, line 16, "temperature" should read --temperatures--.
Col. 6, line 14, "therebetween" should read --between itself and said remainder of said die and said conduit means--;
line 34, "such passages" should read --said passage--;
line 37, "such" should read --said--.

Signed and sealed this 8th day of October 1974.

(SEAL)
Attest:

McCOY M. GIBSON JR.
Attesting Officer

C. MARSHALL DANN
Commissioner of Patents